(12) United States Patent
Fouillot et al.

(10) Patent No.: US 8,873,503 B2
(45) Date of Patent: Oct. 28, 2014

(54) METHOD AND DEVICE FOR TRANSMITTING INFORMATION IN CONTENTION ON TIME SLOTS BETWEEN TRANSCEIVER NODES OF AN AD HOC NETWORK

(75) Inventors: Pascale Marie Adeline Fouillot, Colombes (FR); Raphael Andre Michel Massin, Colombes (FR)

(73) Assignee: Thales, Neuilly sur Seine (FR)

( * ) Notice: Subject to any disclaimer, the term of this patent is extended or adjusted under 35 U.S.C. 154(b) by 304 days.

(21) Appl. No.: 13/268,113

(22) Filed: Oct. 7, 2011

(65) Prior Publication Data

US 2012/0087351 A1    Apr. 12, 2012

(30) Foreign Application Priority Data

Oct. 8, 2010   (FR) ...................................... 10 03993

(51) Int. Cl.
  *H04J 3/00*  (2006.01)
  *H04W 72/12*  (2009.01)
  *H04W 84/18*  (2009.01)

(52) U.S. Cl.
  CPC ............ *H04W 72/121* (2013.01); *H04W 84/18* (2013.01)
  USPC ............................ 370/330; 370/336; 370/468

(58) Field of Classification Search
  USPC .......................... 370/230, 252, 335, 336, 338
  See application file for complete search history.

(56) References Cited

U.S. PATENT DOCUMENTS

| | | | | |
|---|---|---|---|---|
| 7,233,584 B2* | 6/2007 | Nguyen et al. | ................. | 370/337 |
| 7,440,432 B2* | 10/2008 | Niiho et al. | ................... | 370/338 |
| 8,478,821 B2* | 7/2013 | Yang et al. | ..................... | 709/204 |
| 2004/0218577 A1 | 11/2004 | Nguyen et al. | | |
| 2006/0198332 A1* | 9/2006 | Niiho et al. | .................... | 370/328 |
| 2009/0303957 A1* | 12/2009 | Bieth et al. | ..................... | 370/330 |
| 2011/0013601 A1* | 1/2011 | Cerasa et al. | ................. | 370/336 |
| 2012/0083303 A1* | 4/2012 | Min et al. | ....................... | 455/502 |
| 2012/0270583 A1* | 10/2012 | Haykin | ......................... | 455/507 |

FOREIGN PATENT DOCUMENTS

EP   1 699 175 A1   9/2006
WO   WO 2006/010331 A1   2/2006

OTHER PUBLICATIONS

Anis Koubaa, et al "Improving Quality-of-Service in Wireless Sensor Networks by Mitigating 'Hidden-Node Collisions'" IEEE Transactions on Industrial Informatics. vol. 5, No. 3, Aug. 2009—pp. 299 to 313.
Preliminary Search Report and Written Opinion for FR 1003993, of which this application claims priority to, and corresponds to this pending patent application.

* cited by examiner

*Primary Examiner* — Brian O'Connor
(74) *Attorney, Agent, or Firm* — McDermott Will & Emery LLP

(57) ABSTRACT

The method for transmitting information in an ad hoc network comprises at least two transceiver nodes able to receive and transmit information and communicating with each other by sending information in random access time slots organized in frames.
The nodes of the network are broken down into groups according to a distribution rule, the nodes of each group only having the right to transmit information in a predefined subset of frames specific to the group.

13 Claims, 16 Drawing Sheets

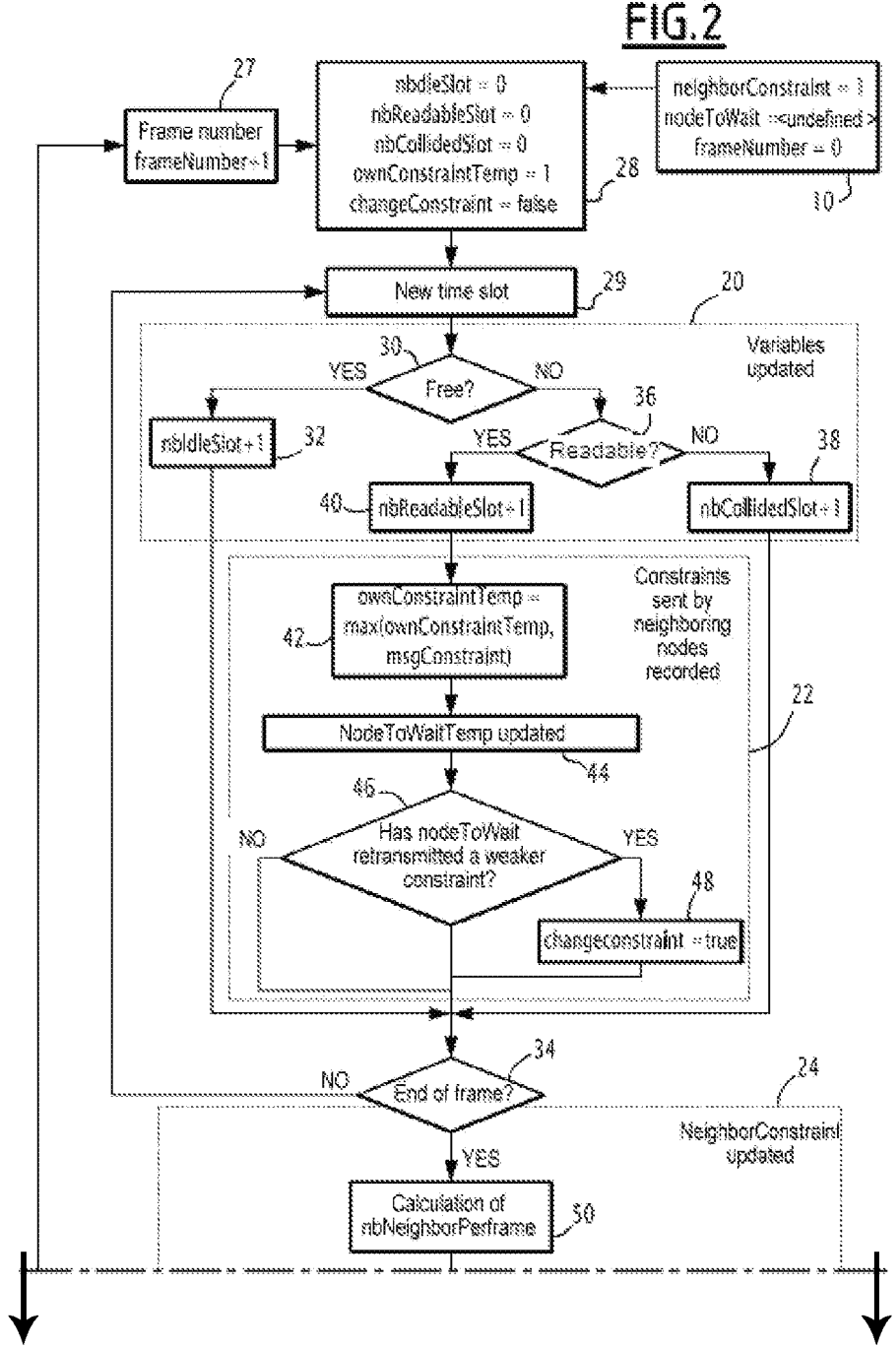

|  | Frame 13 | Frame 14 | Frame 15 |
|---|---|---|---|
| N1 | Subject to q=2 Tx | Subject to q=2 | Subject to q=2 Tx |
| N6 | Subject to q=3 | Subject to q=3 | Subject to q=3 Tx |
| N7 | Subject to q=3 Tx | Subject to q=3 | Subject to q=3 |
| N8 | Subject to q=3 | Subject to q=3 Tx | Subject to q=3 |

2nd Transmission during the estimation period. Do not take into account.

METHOD AND DEVICE FOR TRANSMITTING INFORMATION IN CONTENTION ON TIME SLOTS BETWEEN TRANSCEIVER NODES OF AN AD HOC NETWORK

CROSS REFERENCE TO RELATED APPLICATIONS

The present application claims priority under 35 U.S.C. §119 to French Patent Application No. 10-03993, filed Oct. 8, 2010, which is incorporated herein by reference.

The present invention relates to a method for transmitting information in an ad hoc network comprising at least two transceiver nodes able to receive and transmit information and communicating with each other by sending information in random access time slots organized in frames.

An ad hoc network is a wireless network capable of organizing itself without previously defined infrastructure. There is no central element or access point making it possible to manage the communications between the different entities of the network. Any node of such a network is both a terminal node and a relay node. In such a network, one node is considered to be the neighbor of another when they are close enough for a communication to be possible. Two nodes spaced too far apart for a communication to be possible between them but close enough that each generates destructive interferences on the other are interfering nodes.

An ad hoc network can be formed using the WiFi technology described in document IEEE Std 802.11™—2007, IEEE Standard for Information technology Telecommunications and information exchange between systems Local and metropolitan area networks—Part 11: Wireless LAN Medium Access Control (MAC) and Physical Layer (PHY) Specifications, 2007. A node of this network wishing to transmit information to a receiving node of that same network first broadcasts a message to all of the neighboring nodes that comprises signaling data indicating the identifier for the receiving node. There is a collision at a node when at least two messages are received at the same time on a same time slot. If there is no collision with another message, the node receives a confirmation message from the receiving node and then sends it the useful data. Otherwise it must retransmit the signaling data. The retransmission is only done at the end of a waiting period, the duration of which is calculated using an algorithm, for example an exponential backoff algorithm. This period is often expressed as a multiple of a certain amount of time, which can vary from one unit to several tens of units, or even several hundred. This mechanism makes it possible to limit collisions, but leads to long waiting times between two signaling data transmission tests if the amounts of time have a duration for example of approximately 5 ms.

The aim of the invention is to propose a mechanism for reducing collisions that does not require any significant delay.

To that end, the invention relates to a method of the aforementioned type, characterized in that the nodes of the network are broken down into groups according to a distribution rule, the nodes of each group only having the right to transmit information in a predefined subset of frames specific to the group.

According to other embodiments, the method of the aforementioned type comprises one or more of the following features, considered alone or according to all technically possible combinations:

the distribution rule of a node in a group takes into account the number of neighbor or interfering transmitting nodes that the neighboring nodes of the considered node have;

each node defines a constraint (neighborConstraint) for the neighboring nodes, and each node transmits the defined constraint (neighborConstraint) to the neighboring nodes, and each node defines the group to which it belongs according to the distribution rule as a function of the constraints (neighborConstraint) received from the neighboring nodes;

the node defines the group to which it belongs according to the distribution rule as a function of the constraint (neighborConstraint) received from the neighboring nodes leading to the lowest transmission frequency;

the step for defining a constraint (neighborConstraint) by a node for the neighboring nodes includes a first step for estimating the number of neighboring and interfering nodes that transmit for a given frame, a second step for estimating the total number of neighboring or interfering transmitting nodes, a third step for smoothing the total number of neighboring or interfering transmitting nodes, and a fourth step for establishing the constraint (neighborConstraint) as a function of the smoothed total number of neighboring or interfering nodes and a target minimum probability ($p_{Seuil}$) that the neighbors of the node can transmit information without collisions;

the step for estimating the number of neighboring or interfering nodes that transmit for a given frame is based on measuring the number of time slots on which: no transmission has been detected, a single transmission has been received, and more than two transmissions generating a collision have been detected;

the step for estimating the total number of neighboring or interfering transmitting nodes includes a summation of the number of neighboring or interfering nodes having transmitted messages in each of the frames corresponding to the set of distribution groups of the nodes according to the constraint (neighborConstraint) defined by the node and transmitted to its neighboring nodes;

the step for calculating the total number of neighboring or interfering transmitting nodes by a node includes a weighting of the calculated total number of current transmitting or interfering nodes, by the total number of neighboring or interfering transmitting nodes previously calculated for that node;

each node defines the group to which it belongs according to the distribution rule by subjecting itself to a constraint (ownConstraint) among the constraints of the neighboring nodes (neighborConstraint) and in which the calculation of a constraint (ownConstraint) specific to a node is only done if at least one of the following three conditions is met:

there are no higher constraints (neighborConstraint) received from a neighboring node, the neighboring node having defined the constraint (ownConstraint) to which the considered node subjects itself has transmitted a lower constraint, the expiration of a predetermined period of time (TimeToLive);

each node defines the group to which it belongs according to the distribution rule by subjecting itself to a constraint (ownConstraint) among the constraints of the neighboring nodes (neighborConstraint) and in which each node transmits the constraint (ownConstraint) to which it subjects itself (msgConstraint);

a node having transmitted a constraint (neighborConstraint) to a preceding frame determines whether the constraint to which a neighboring node subjects itself (ownConstraint), and that it has received from that neighboring node, is below the constraint (neighborConstraint) that it transmitted and whether the constraint (ownConstraint) to which the neighboring node subjects itself is below the constraint (neighborConstraint) that it has transmitted, then the node does not take into account the estimating elements of its neighborhood calculated during the current frame;

a node imposing a constraint (neighborConstraint) on its neighbors determines whether a same neighboring node transmits at least twice during n consecutive frames, n being the constraint (neighborConstraint) imposed on the node, and if the neighboring node transmits at least twice during n consecutive frames, the node only takes the neighboring node into account a single time to define its number of neighboring or interfering transmitting nodes;

the transmissions between the nodes lack messages dedicated to the signaling to reduce the number of collisions in the network.

The invention also relates to an ad hoc network including a set of transceiver nodes able to receive and transmit information and communicating with each other by sending information in frames, characterized in that each node includes means for implementing the method as described above.

These features and advantages of the invention will appear upon reading the following description, provided solely as an example, and done in reference to the appended drawings, in which:

FIG. 3 is a table showing different situations upon sending of messages on a same frame;

FIGS. 4, 5 and 6 are tables showing examples of message transmissions in a frame;

FIGS. 11, 12, 13, 14, 15, 16, 17, 18 and 19 are diagrams showing example embodiments of the algorithm of the inventive method.

Figure 1:
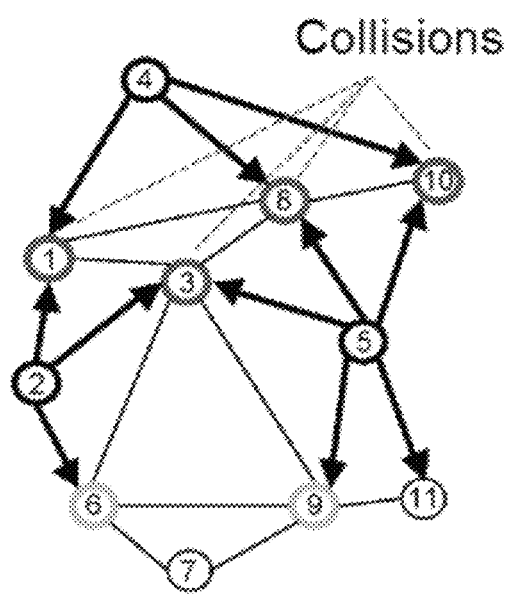
FIG. 1 is a diagrammatic view of an ad hoc network at a given time moment.

The network illustrated in FIG. 1 is for example an ad hoc network for communication between individuals on a field of operation. In this figure, the service ranges of the network nodes are shown by solid lines. This ad hoc network uses random access time slots to transmit messages. These time slots are distributed in frames with a constant number of time slots in each frame from one frame to the next.

This network for example meets the WiMax mobile standard 802.16m.

Each individual is equipped with a transceiver constituting a node of the network. Each node includes communication means for receiving messages and transmitting them on frames divided into time slots. A time slot makes it possible to transmit a message having a size compatible with the duration of the time slots. Then, upon each frame, a message is transmitted during a time slot. The choice of that time slot is done randomly. This time slot is used for broadcast transmission.

The network shown in FIG. 1 includes eleven nodes, numbered from 1 to 11, and shows four collision situations at the nodes 1, 3, 8 and 10. At the node 1, there is a collision between the messages transmitted by the nodes 2 and 4, at the node 3, there is a collision between the messages transmitted by the nodes 2 and 5, at the node 8, there is a collision between the messages transmitted by the nodes 4 and 5, and at the node 10, there is a collision between the messages transmitted by the nodes 4 and 5.

Figure 2:
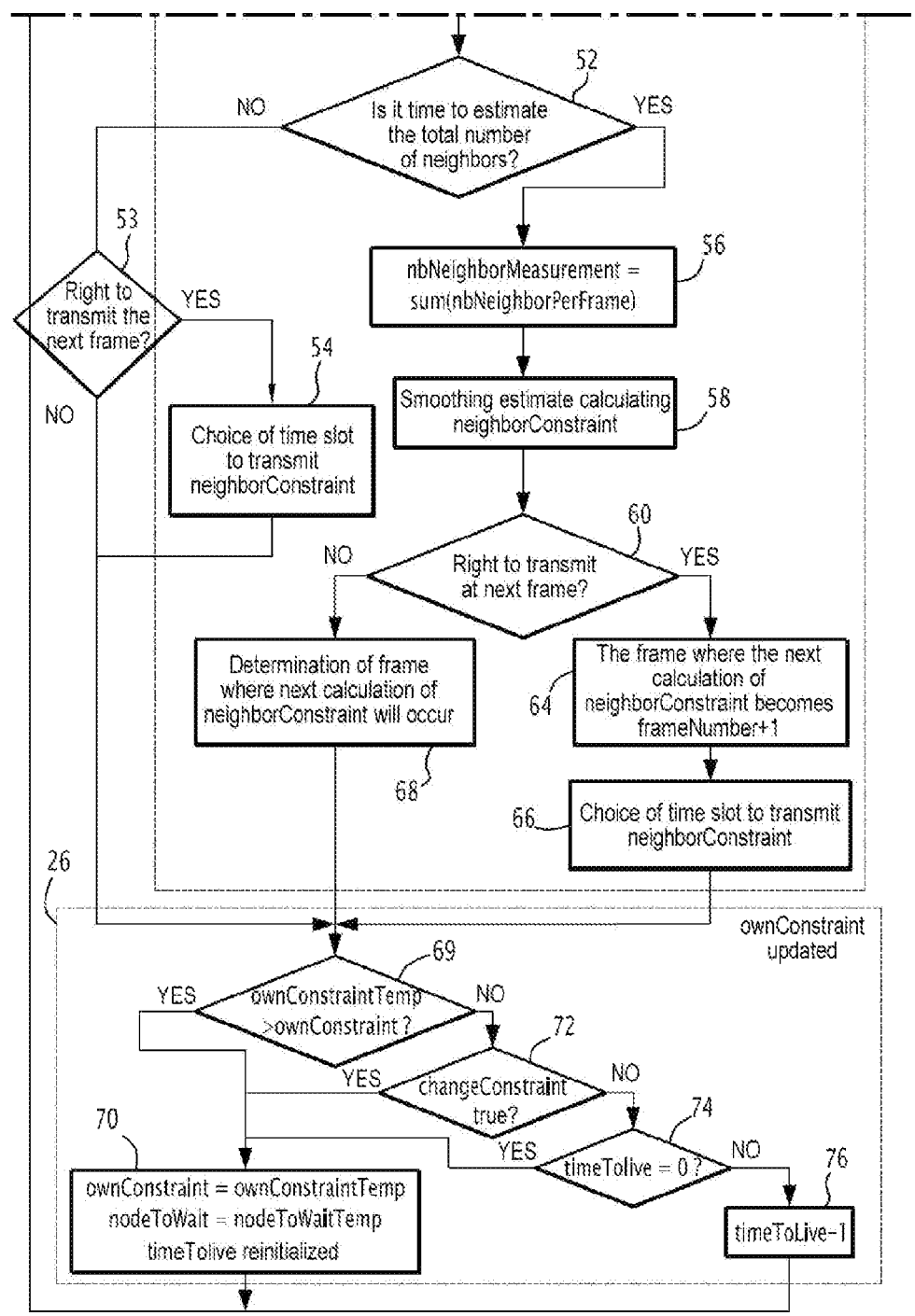
FIG. 2 is a flowchart of the collision reduction algorithm of the inventive method.

Each node can continuously implement the algorithm of FIG. 2. That algorithm is implemented for each new frame received by the considered node.

Lastly, an as to allow the algorithm to be implemented, in order to reduce the number of collisions, the variables contained in the following two fields are added to each message sent in a time slot of the message transmitted by the node:

msgConstraint, which represents a constraint imposed by the transmitting node at each of its neighboring nodes; and ownConstraint, which represents the constraint that the transmitting node imposes on itself as a function of the constraints imposed on it by the neighboring nodes.

A node subjected to a constraint ownConstraint has the right to transmit all of the ownConstraint frames, and it must renounce transmitting in the other frames. The algorithm therefore ensures the definition of the constraint specific to each node, which amounts to distributing the nodes into groups, each associated with frames, only the nodes of the group associated with a given frame having the right to transmit in that frame. The algorithm thereby reduces the risks of collision.

This constraint ownConstraint is determined by each node for itself as a function of the constraints msgConstraint imposed by the neighboring nodes.

Thus, each node:

Estimates the number of neighboring or interfering nodes transmitting in its neighborhood as a function of the number of slots correctly received, in collision and free;

Calculates the collision probability in its neighborhood;

Calculates a constraint to be imposed on its neighbors to achieve a threshold collision probability;

Subjects itself to the constraints imposed by its neighbors.

An initialization phase 10 precedes the execution of the algorithm. During this phase, certain status variables are initialized:

neighborConstraint is an integer imposed by the node considered at each of its neighboring nodes, initialized at the value 1, nodeToWait is the identifier of the node transmitting the constraint to which the considered note is subjected, initialized at the "undefined" value, frameNumber is the number of the current frame, initialized at zero.

More specifically, the algorithm includes four major phases 20, 22, 24 and 26 illustrated in FIG. 2 respectively corresponding to an estimate of the number of neighbors and interfering nodes transmitting in a frame during phase 20, a recording of the constraints sent by the neighbors during a frame, during phase 22, an update, under certain conditions, of the constraint to be imposed on its neighbors, during phase 24 and an update, under certain conditions, of the constraint to which the node subjects itself during a frame in phase 26.

The first two phases 20, 22 are carried out upon each new time slot while the last two phases 24, 26 are done at each frame end.

Phase 20 consists of updating variables containing the number of free slots, readable and in collision with the considered node once it receives the information from a new time slot. These variables will subsequently allow it to estimate the number of nodes having transmitted in its vicinity at the end of the frame.

Phase 22 is only carried out if the time slot in progress is readable. It consists of recording the constraints sent by the transmitting node neighboring the considered node.

Phase 24 consists of calculating the total number of transmitting nodes, neighbors of or interfering with the considered node, from variables updated during phase 20 and under certain conditions, determining the distribution rule to be imposed on the nodes neighboring the considered node, given the estimated number of neighboring or interfering transmitting nodes.

Lastly, phase 26 consists of an update of the distribution rule to which the considered node must subject itself.

The same algorithm is used continuously by each node of the network.

Here we consider the application of the algorithm of FIG. 2 for a node of an ad hoc network.

This algorithm is implemented for each new frame, the reception of which starts in step 27, during which the variable frameNumber is incremented by 1.

The variables used by the algorithm are first initialized for each new frame during step 28, in the form:
nbReadableSlot=0, nbCollidedSlot=0 and nbIdleSlot=0, ownConstraintTemp=1 and changeConstraint="false" for the considered node, these variables meeting the following definitions:
  nbReadableSlot is the number of readable time slots in a frame. A time slot is readable if a message has been received, i.e. If a neighboring node of the considered node has accurately tried to access the time slot.
  nbCollidedSlot is the number of time slots during a frame in which collisions have occurred. A time slot is a collision if at least two neighboring or interfering nodes of the considered node have sent a message on that slot.
  nbIdleSlot is the number of free time slots in a frame. A time slot is free if no neighboring or interfering node has sent a message on that slot.
  ownConstraintTemp is the highest constraint received from the neighboring nodes of the considered node during the frame undergoing reception. A distribution rule imposes, on the nodes that subject themselves thereto, transmitting only once every q frames, q being called the constraint. ownConstraint is the constraint q to which the considered node subjects itself at a given moment, which can be different from ownConstraintTemp, and
  changeConstraint is a Boolean assuming the value "true" if the constraint ownConstraint must be updated.

Phases 20 and 22 are implemented for each new time slot of the frame received in step 29.

Phase 20 starts upon reception of the message contained in the new time slot by a first step 30 consisting of determining whether that time slot is free.

If the slot is free, the variable nbIdleSlot is incremented by one unit during step 32 and one goes directly to the end of phase 22, where it is determined during step 34 whether the frame determined in step 27 is finished. If it is not finished, the considered node must process the information contained in a new time slot detected in step 29. If not, phase 24 is carried out.

If the slot is not free during the test in step 30, in step 36 it is determined whether the slot is readable.

If the slot is not readable, the variable nbCollidedSlot is incremented by one unit during step 38 and one goes directly to step 34 at the end of phase 22.

If the slot is readable, the variable nbReadableSlot is incremented by one unit during step 40 and one then goes on to step 22.

Phase 22 is therefore only carried out if the time slot in progress is readable.

This phase starts with a step 42 during which the node compares the received constraint, represented by the variable msgConstraint, with the variable ownConstraintTemp, which is the highest constraint received from the neighboring nodes of the considered node during the frame undergoing reception. The highest constraint between the received constraint msgConstraint and the variable ownConstraintTemp, until then the highest, is recorded in the variable ownConstraintTemp.

In the following step 44, the identifier of the node transmitting that highest constraint is recorded in a variable nodeToWaitTemp.

Step 46 consists of verifying whether the node nodeToWait having transmitted during the frames preceding the constraint msgConstraint to which the considered node subjects itself has retransmitted a lower constraint. If it has not, one goes on to step 34; otherwise the variable changeConstraint assumes the value "true" during step 48 and one then goes on to step 34.

Phase 24 starts with a step 50 for calculating the number of neighboring or interfering nodes having transmitted in the frame just received, this number is stored in a table nbNeighborPerFrame indexed by the number of the modulo current frame neighborConstraint. Hereafter, to lighten the notations, the index is omitted. To carry out the calculation, one uses the relationship:

$$\text{nbNeighborPerFrame} = \text{nbReadableSlot} + k \cdot \text{nbCollidedSlot with } k \geq 2 \quad (1)$$

The coefficient k is first set upon initialization of the network as a function of the average number of neighboring or interfering nodes per node and the number of time slots in a frame. Its value can then be changed dynamically to better reflect the local topology of the network around the considered node.

The following examples illustrate the choice of the coefficient k.

Figures 3, 4:
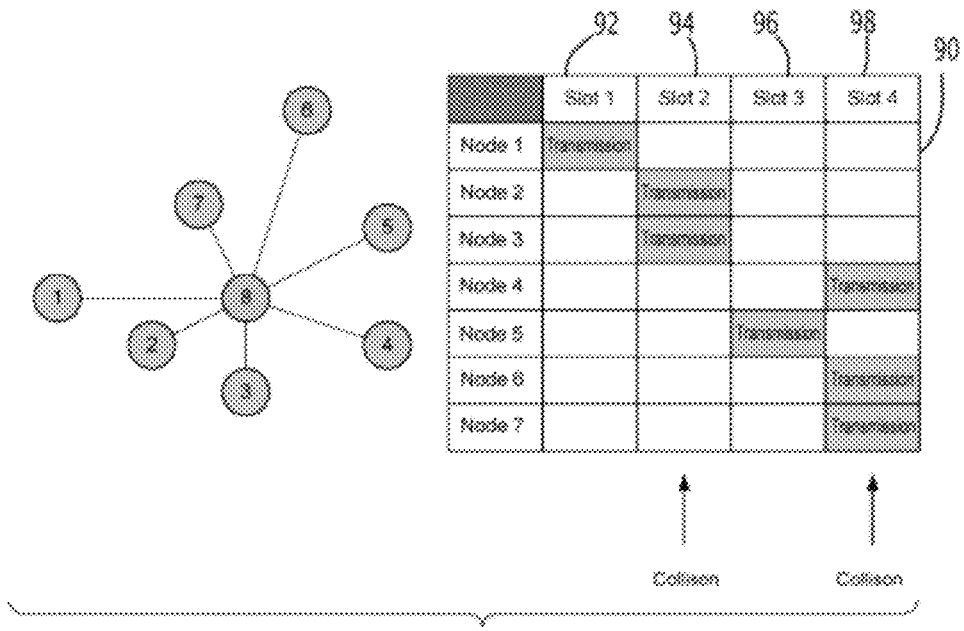

In FIG. 3, an ad hoc network is made up of eight nodes numbered from 1 to 8. A node 8 listens to the messages sent by nodes in its neighborhood and seeks to estimate its number of transmitting nodes, whether neighboring or interfering. A table 90 shows a frame divided into four time slots 92, 94, 96 and 98, during which the nodes numbered 1 to 7 transmit messages. By analyzing the messages received on that frame, node eight detects a collision during time slots 94 and 98; the two time slots 92 and 96 are readable. An estimate of the number of neighboring or interfering nodes having transmitted in the frame consists of applying relationship (1). In the example of FIG. 3, the variables nbReadableSlot and nbCollidedSlot are equivalent to two. By choosing k=2, the node 8 estimates having six neighbors.

In FIG. 4, a frame 100 is divided into five time slots 101, 102, 103, 104 and 105. Seven nodes, numbered from 1 to 7, transmit messages in that frame. The ratio between the number of nodes and the number of time slots is then equal to 1.4. An ideal k is calculated equal to the number of colliding messages divided by the number of time slots on which the collisions occur, in FIG. 4, there are four messages 106, 107, 108 and 109 that collide, these collisions occurring during two time slots 102 and 105. The ideal k assumes the value 2.

Figures 5, 6:
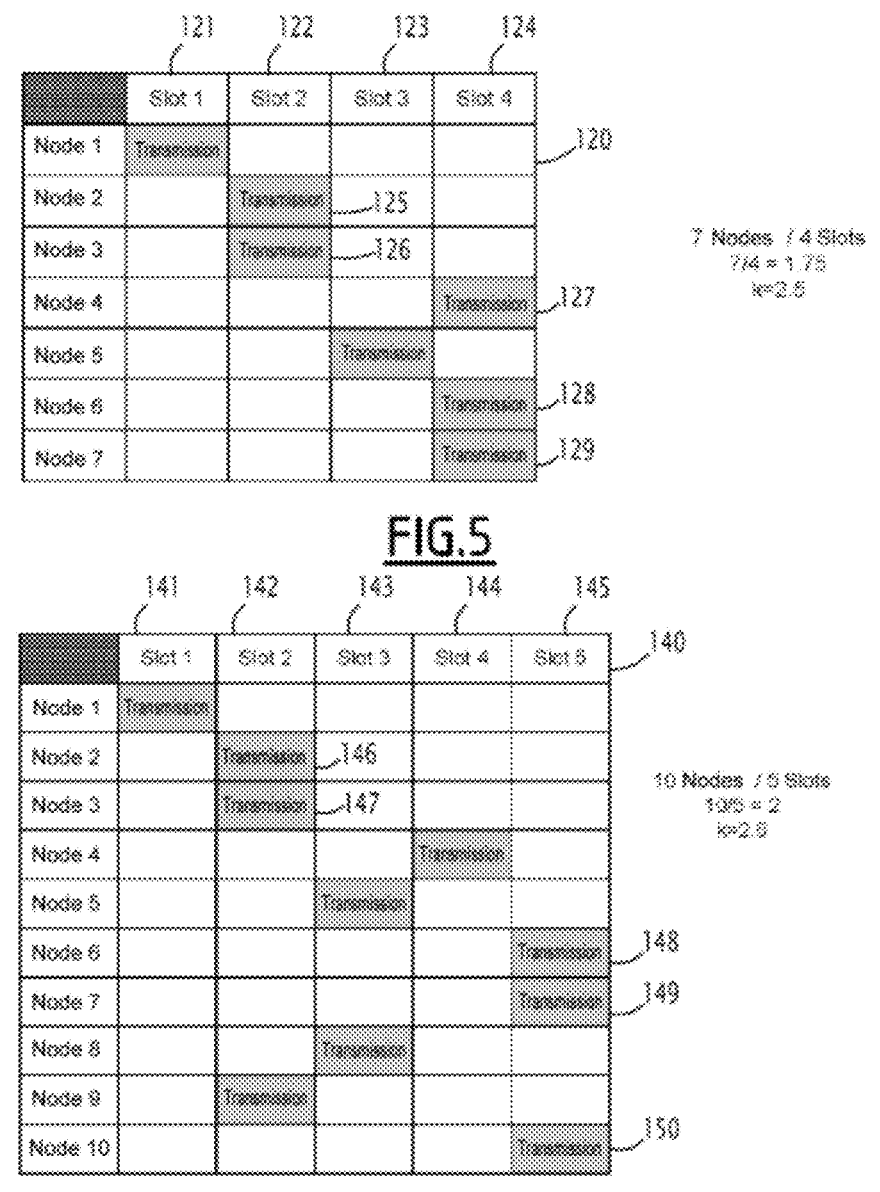

In FIG. 5, a frame 120 is divided into four time slots 121, 122, 123 and 124. Seven nodes, numbered from 1 to 7, transmit messages in that frame. The ratio between the number of nodes and the number of time slots is then equal to 1.75. In FIG. 5, there are five messages 125, 126, 127, 128 and 129 that collide, these collisions occurring during the two time slots 122 and 124. The ideal k assumes the value of 2.5.

In FIG. 6, a frame 140 is divided into five time slots 141, 142, 143, 144 and 145. Ten nodes, numbered from 1 to 10, transmit messages in that frame. The ratio between the number of nodes and the number of time slots is then equal to 2. In FIG. 6, there are five messages 146, 147, 148, 149 and 150 that collide, these collisions occurring during two time slots 142 and 145. The ideal k assumes the value 2.6.

FIGS. 4, 5 and 6 show the fact that the higher the ratio between the number of nodes and the number of time slots in a frame, the greater the ideal factor k.

During the beginning of phase 24, the considered node imposes on the neighboring nodes, for the moment, a distribution rule whereof the value of the constraint is stored in a variable neighborConstraint.

The estimation of the total number of transmitting nodes, whether neighboring or interfering, of the considered node, which then makes it possible to determine the new constraint to be imposed on the neighboring nodes, is done on the last Q=neighborConstraint frames, by adding the estimated neighborhoods in each of the Q frames.

To that end, during a step 52, the node determines whether it involves the last estimation before being able to estimate the total number of transmitting nodes, neighboring or interfering, and calculates the new constraint to be imposed on the neighboring nodes.

If it does not involve the last estimation and if the node has the right to transmit to the next frame, which is verified during step 53, the considered node chooses randomly, in step 54, a time slot to transmit, in the next frame, the useful information as well as the constraints msgConstraint, which assumes the value of neighborConstraint and ownConstraint. During step 53, the node determines whether it has the right to transmit by verifying whether it belongs to the group that has that right, the different nodes of the network being distributed into groups according to a distribution rule. For example, a node subjected to a constraint ownConstraint has the right to transmit a constraint for its neighborhood in the following frame if and only if its modulo MAC address ownConstraint is equal to the number of the modulo following frame ownConstraint, i.e.

mod(@MAC,ownConstraint)=mod(frameNumber,own-Constraint).

If it does not involve the last estimation and the considered node does not have the right to transmit, one goes directly to the end of phase 24.

If it involves the last estimation, in step 56, one stores in a variable nbNeighborMeasurement the sum of the numbers of transmitting nodes, neighboring or interfering, estimated in each of the Q frames, i.e. the sum of the nbNeighborPerFrame. In a following step 58, smoothing of the estimation of the total number of neighboring nodes nbNeighborEstim is done by weighting the value estimated in the current frame by that estimated in the preceding one according to the relationship:

nbNeighborEstim=α*nbNeighborEstim+(1−α)*nbNeighborMeasurement    (2)

where nbNeighborEstim is a variable initialized at the beginning of performance of the algorithm at zero or another value if the total number of neighbors in the ad hoc network is known from the beginning, and α a weighting coefficient, for example equal to 0.8.

The smoothing of the neighborhood estimation makes it possible to avoid constraint changes upon each error.

During a same step 58, the node calculates the new constraint neighborConstraint to be imposed on the neighboring nodes.

The value of the constraint neighborConstraint to be imposed on the neighboring nodes as a function of the estimated neighborhood is established as follows.

Let n be the number of time slots in a frame. Let N be the number of transmitting nodes in the neighborhood at one hop from the listening node (most interfering neighbors).

In the proposed example, the hypothesis is that all of the nodes of the neighborhood of the listening node must transmit a message to each frame. The probability that the listening node will receive the message from one of its neighbors during a frame without a collision occurring is written:

$$\overline{p_{collision}}(S)=(1-1/n)^{N-1} \qquad (3)$$

A probability $P_{Seuil}$ is for example set at 0.8, corresponding to the minimum probability that the neighbors of the listening node need to make themselves heard by said listening node.

The maximum number of neighbors and interfering nodes transmitting on a same frame and able to surround the listening node on as not to exceed $P_{Seuil}$ is given by the relationship:

$$M = 1 + \ln(p_{seuil}) / \ln\left(1 - \frac{1}{n}\right) \qquad (4)$$

In the case where the number of neighboring and interfering nodes, denoted P, estimated by the listening node is greater than M, then the neighboring nodes must be divided into Q groups transmitting once every frames, with:

$$Q=\lfloor P/M \rfloor+1 \qquad (5)$$

with $\lfloor x \rfloor$, which represents the integer part of x.

The value of P is equal to nbNeighborMeasurement.

Q is called the constraint and the value of neighborConstraint is equal to Q.

The $q^{th}$ group (with $1<q<Q$) is formed by neighboring nodes whereof the modulo MAC addresses are equal to q−1 and transmit to each frame whereof the modulo number Q is equal to q−1. The estimation of the number of neighboring and interfering nodes must thus be done every Q frames, by adding the neighborhoods estimated during each of the Q frames.

In the case where the number of neighboring and interfering nodes estimated by the listening node is below M, then the neighboring nodes can continue to transmit to each frame. One then sets Q=1.

Figure 7:
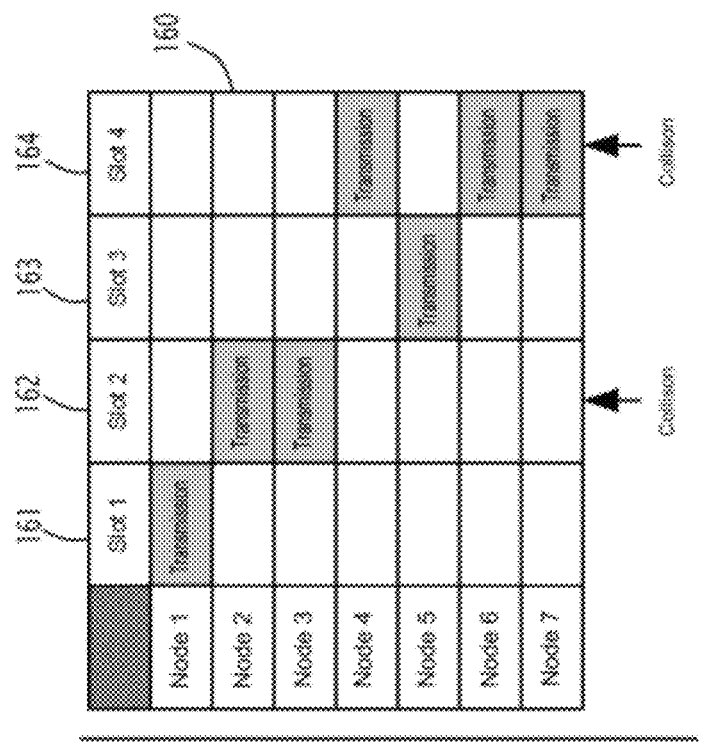
FIGS. 7, 8, 9 and 10 are diagrammatic views of an example of application of the collision reduction algorithm of the inventive method.
Figure 7:
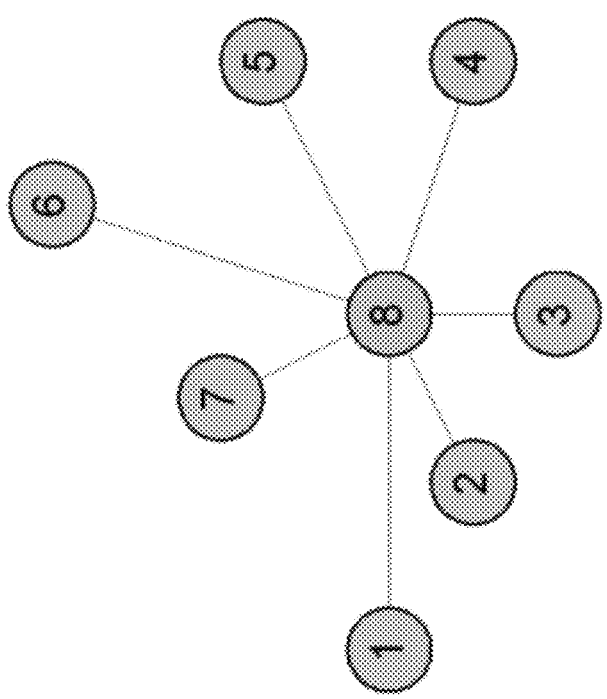

In FIG. 7, an ad hoc network is made up of eight nodes numbered 1 to 8. One node 8 is listening to messages sent by nodes in its neighborhood or by interfering nodes. In that figure, a frame 160 is divided into four time slots 161, 182, 163 and 164. One sets k=2 and $p_{Seuil}$=0.70. By applying the formula of equation (4), one obtains M=2.23. The node 8 not knowing the number of neighboring nodes surrounding it, it imposes the constraint Q=1 on its neighboring nodes. The latter, being 7, therefore have an identification probability of 0.18, according to equation (3). One assumes that the neighboring nodes of the node 8 have transmitted messages as shown in table 160. By applying the formula of equation (1), knowing that there are two readable time slots, two colliding time slots and that k=2, the node 8 estimates six neighbors.

The node 8 calculates the constraint to send its neighbors according to equation (5), which equals Q=3. Assuming that the number of the first frame during which the nodes must subject themselves to the constraint imposed by node 8 is 1, nodes 1, 4 and 7 may transmit during frame 1, nodes 2 and 5 will transmit during the second frame and nodes 3 and 6 will transmit during the third frame.

Figure 8:
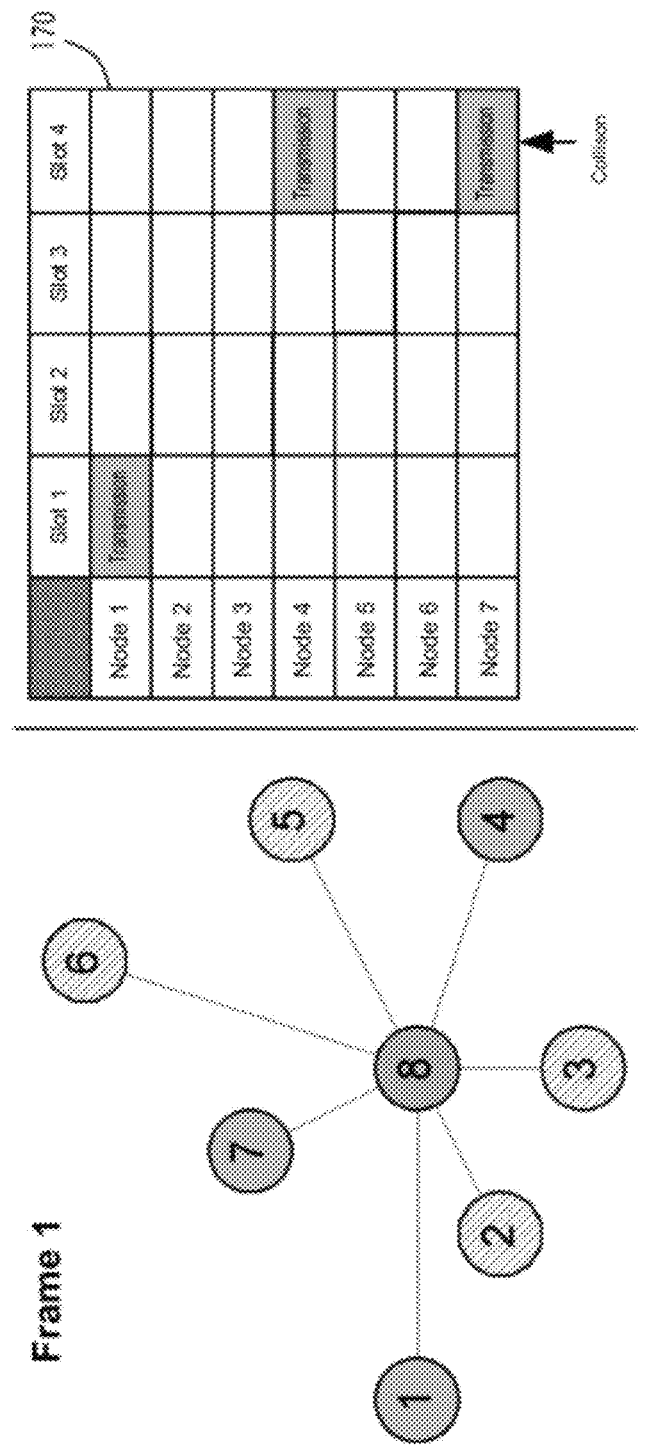

In FIG. 8, only nodes 1, 4 and 7 transmit during frame 1, shown by table 170. The probability that there will be no collision is then 0.56, according to equation (3).

Figure 9:
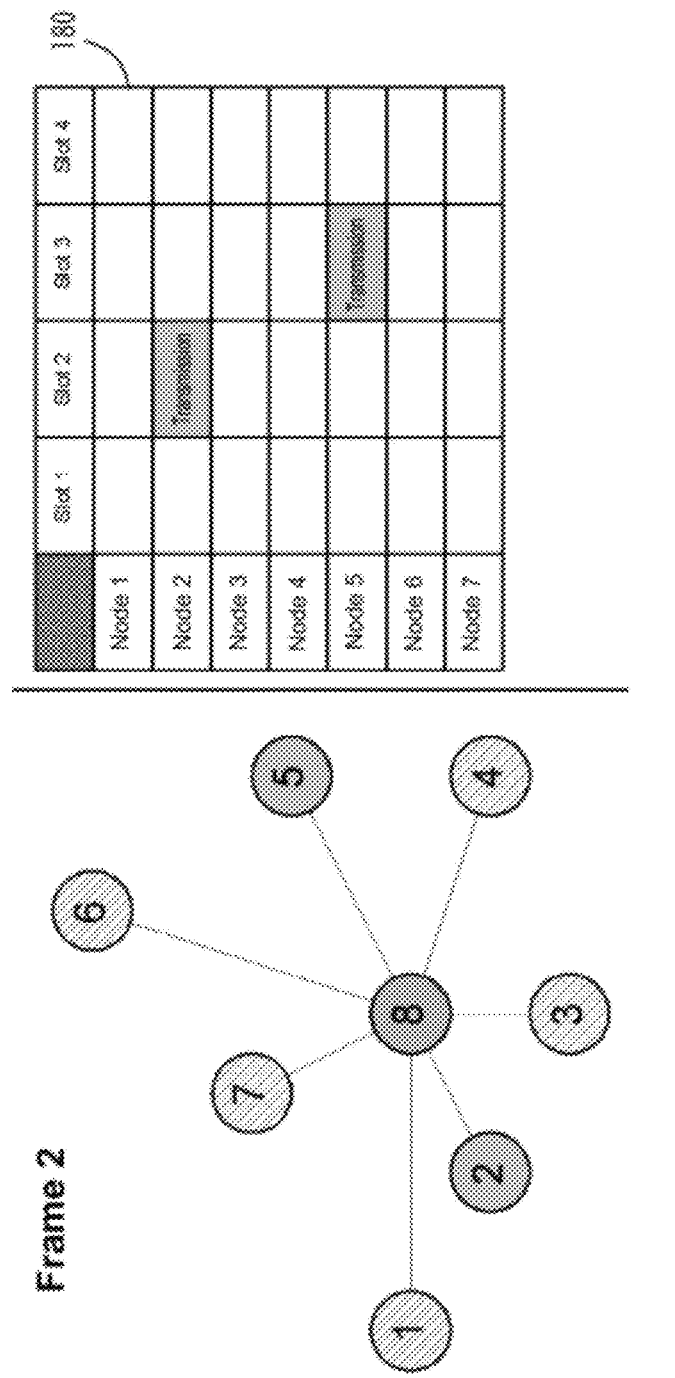

In FIG. 9, only nodes 2 and 5 transmit during frame 2, shown by table 180. The probability that there will be no collision is then 0.75, according to equation (3).

Figure 10:
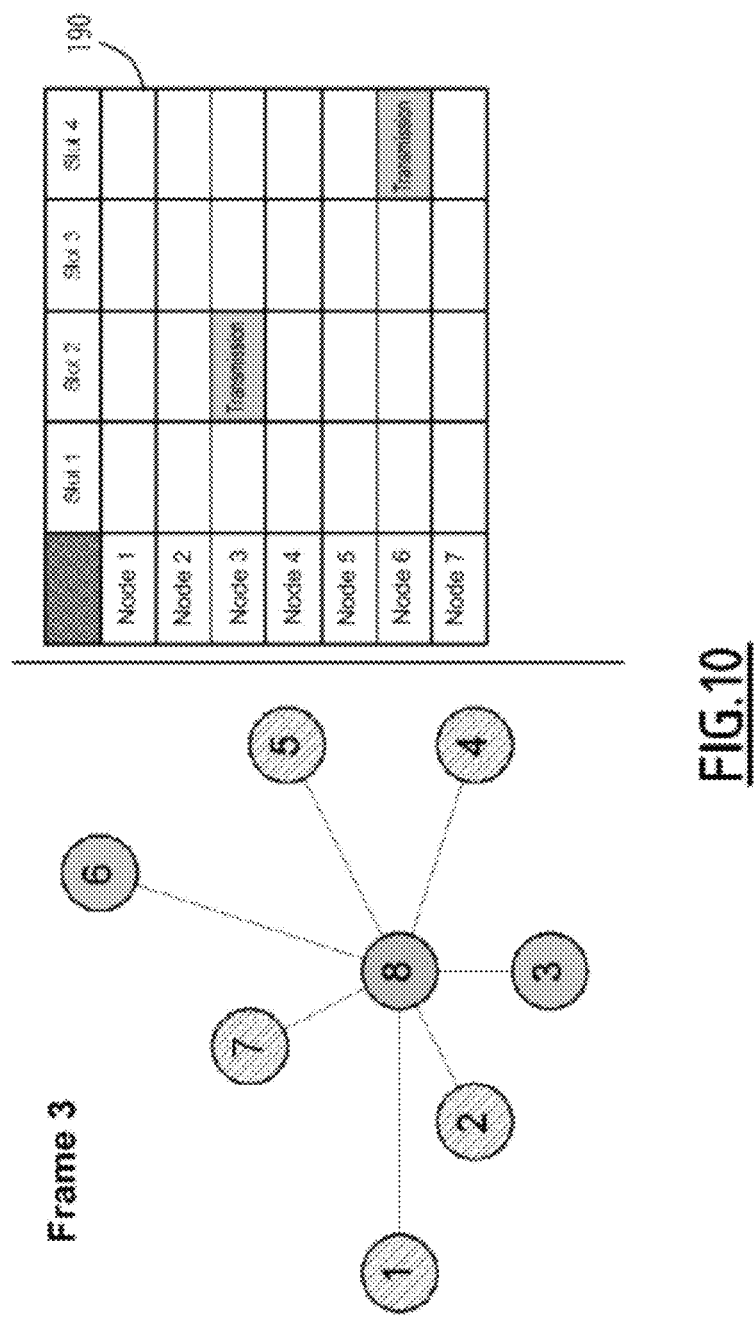

In FIG. 10, only nodes 3 and 6 transmit during frame 3, shown by table 190. The probability that there will be no collision is then 0.75, according to equation (3). The constraint imposed by node 8 being equal to 3, the next estimation of the number of neighbors is done at the end of frame 3, where it estimates:

$$nbNeighbourMeasurement = \underbrace{1+k*1}_{Frame1} + \underbrace{2+k*0}_{Frame2} + \underbrace{2+k*0}_{Frame3} = 7$$

neighbors. The new constraint neighborConstraint to be sent to the neighbors is calculated using equation (5), it is equal to Q=4. The algorithm then continues with this new constraint.

In step 60, the node determines whether it has the right to transmit the new constraint in the following frame following the same processing as in step 53.

If the considered node has the right to transmit in the following frame, one goes on to step 64, which consists of calculating the number of the frame at the end of which the considered node must determine the next constraint neighborConstraint that it will impose on its neighbors: it is the following frame (frameNumber+1).

In step 66, the considered node randomly chooses a time slot to transmit, in the next frame, the useful information as well as the new constraints msgConstraint (which assumes the value of neighborConstraint) and ownConstraint.

If the considered node does not have the right to transmit in the following frame, in step 68, the considered node calculates the number of the frame at the end of which it must determine the next constraint neighborConstraint that it will impose on its neighbors. There are two cases: (1) if the constraint has just been transmitted, then the next calculation of neighborConstraint will be done Q frames later: frameNumber+Q; (2) otherwise the next calculation of neighborConstraint will be done in the following frame: frameNumber+1.

Phase 24 thus ends with step 66 or 68.

In phase 26, the constraint to which the considered node must subject itself is determined. The mechanism for updating ownConstraintTemp described in step 42 ensures the application of the basic principle according to which a node receiving several constraints from its neighbors submits to the strongest one, which amounts to choosing the lowest transmission frequency.

Figure 11:
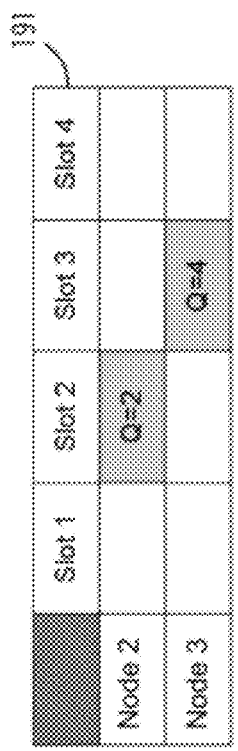
Figure 11:
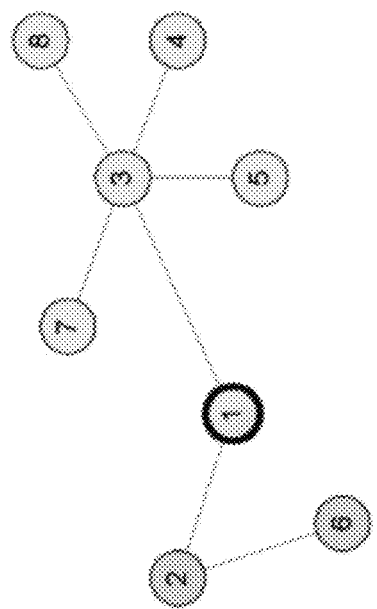

In FIG. 11, an ad hoc network is made up of eight nodes numbered from 1 to 8. One assumes that the neighboring nodes 2 and 3 of node 1 have transmitted constraints during a frame, as shown in table 191. According to this basic principle, the node 1 will submit to the constraint transmitted by node 3, i.e. Q=4.

The neighbor of the considered node sending the strongest constraint can itself be subjected to a constraint by one of its neighbors. It therefore may not send its constraint to each frame. The nodes subjecting themselves to its constraint must not, for all that, subject themselves to lower constraints when they do not receive its constraint.

Figure 12:
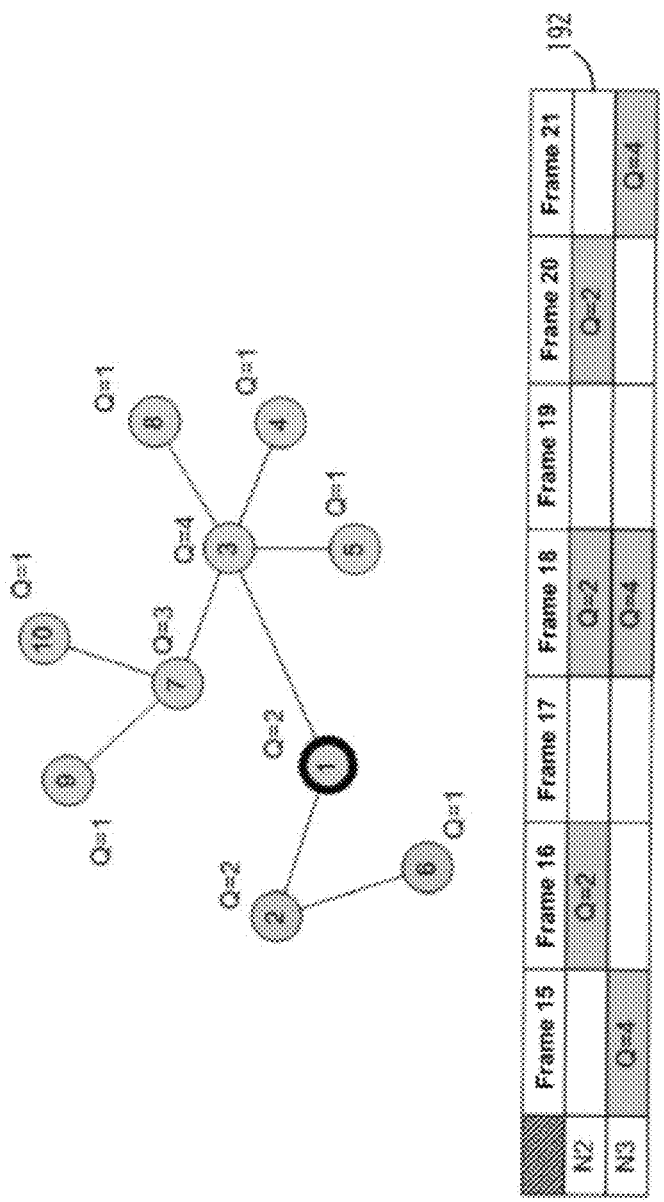

In FIG. 12, an ad hoc network is made up of ten nodes numbered from 1 to 10 with, for each node, the constraints imposed on the neighbors. A table 192 shows the constraints received by the node 1 during seven consecutive frames, numbered from 15 to 21. In this example, node 3 sends the constraint Q=4 during frame 15. Itself being subjected to the constraint q=3, it can only transmit to frames 18 and 21. According to the basic principle, during frames 16 to 21 the node 1 must subject itself to the constraint q=4. If this basic principle is not respected, the number of neighbors will be overestimated by the node 3, transmitting the maximum constraint, and the algorithm will diverge with an infinite estimation of the number of neighbors.

Phase 26 therefore starts with step 69, during which the considered node determines whether ownConstraintTemp is greater than the constraint to which it is subjected ownConstraint.

If it is, one goes on to step 70, during which the node determines its own constraint by allocating the value ownConstraintTemp to the variable ownConstraint and the value nodeToWaitTemp to the variable nodeToWait. At the same time, the counter TimeToLive is reinitialized at a certain value, for example twice the constraint to which the considered node is subjected. This counter makes it possible to define whether a node has not transmitted for a long time.

If, in step 69, the variable ownConstraintTemp is not greater than the constraint to which it is subjected ownConstraint, the variable changeConstraint is compared to "true" during step 72.

If it is equal to "true," i.e. the node transmitting the constraint to which the considered node is currently subjected has transmitted a lower constraint, one goes on to step 70. If not, one goes to step 74, during which the value of timeToLive is examined. If timeToLive reaches the value 0, then one considers that the node is probably no longer in the neighborhood of the considered node. In step 74, one tests whether the counter timeToLive of the node that transmitted the constraint to which the considered node is subjected is null. If timeToLive is equivalent to zero, than one goes on to step 70, and if not one goes to step 76, during which the counter TimeToLive is decremented by one unit.

Steps 69, 72 and 74 avoid the divergence of the algorithm by requiring the considered node to subject itself to the maximum constraint that it received during a frame if and only if that maximum constraint is greater than the constraint to which it is subjected or the node to which it subjects itself has retransmitted a lower constraint or the node to which it subjects itself is probably no longer in its neighborhood.

Figure 13:
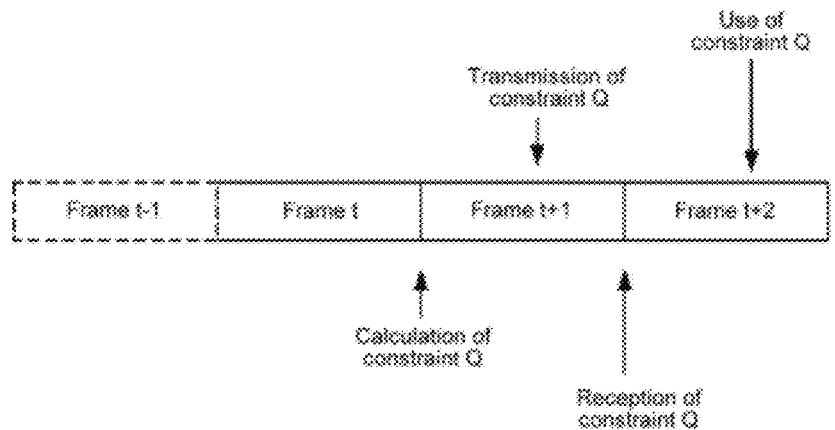
Figure 14:
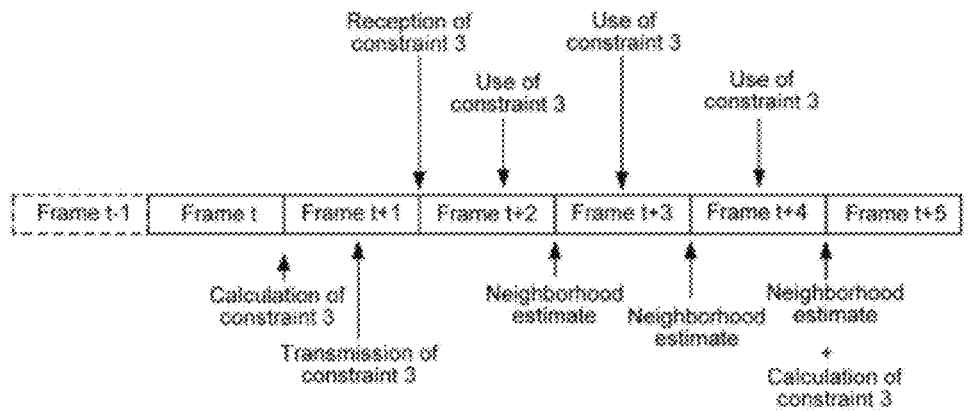
Figure 15:
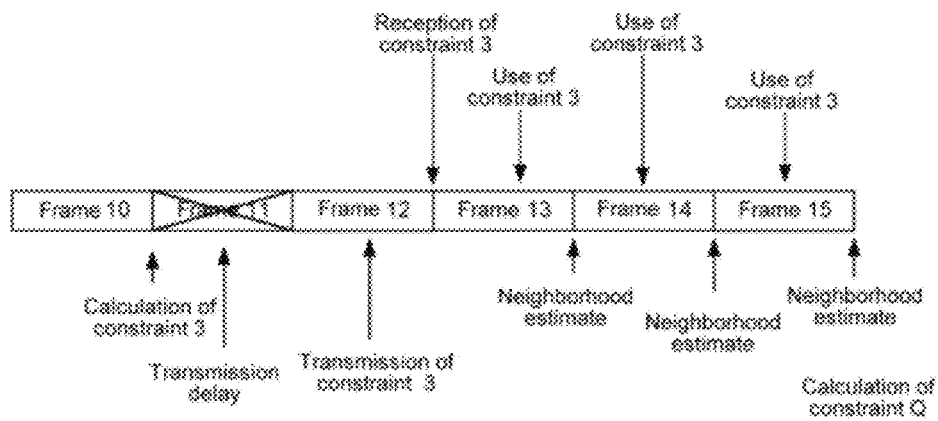

FIGS. 13 to 15 explain the time shifts between the transmission and application of the constraints by a transmitting node and by receiving nodes, respectively.

In FIG. 13, a node calculates, at the end of a frame t, the constraint Q to be imposed in its neighborhood. Assuming that the constraint q to which the considered node subjects itself allows it, it transmits the constraint Q to the neighboring nodes in the following frame t+1. The neighboring nodes receiving that constraint submit to it as of frame t+2.

In FIG. 14, a node calculates, at the end of a frame t, the constraint Q to be imposed on its neighborhood. In the example of FIG. 14, the constraint is equal to three. Assuming that the constraint q to which the considered node submits allows it, the latter transmits the constraint to frame t+1, the neighboring nodes submit to frame t+2. The considered node starts its estimations of the neighborhood from the end of frame t+2. The next calculation of the constraint is done at the end of frame t+2+Q−1, or at the end of frame t+4 in the example of FIG. 14, from estimates of the neighborhood done on frame t+2, t+3, ... t+2+Q−1, of on frames t+2, t+3 and t+4 in the example of FIG. 14.

In FIG. 15, a node 2 calculates, at the end of a frame 10, the constraint Q to be imposed on its neighborhood. In the example of FIG. 15, the constraint is equal to three. The considered node is subjected to a constraint, which in this example prevents it from transmitting the constraint to the following frame 11. There is a transmission delay for the constraint to be imposed on the neighboring nodes. Let v be the frame to which the listening node has the right to transmit the constraint previously calculated. The listening node must then postpone its next constraint calculation to frame v+Q from estimates done at the end of frames v+1, v+2, ... v+Q. In the example of FIG. 15, v assumes the value 12, the listening node performs the calculation of the new constraint at the end of frame 15, from estimates done at the end of frames 13, 14 and 15. In this example of application of the algorithm, no estimate of the neighborhood is done at the end of the transmission frame of the constraint, or at the end of frame 12, and at the end of the transmission delay frame of the constraint, or at the end of frame 11.

Figure 16:
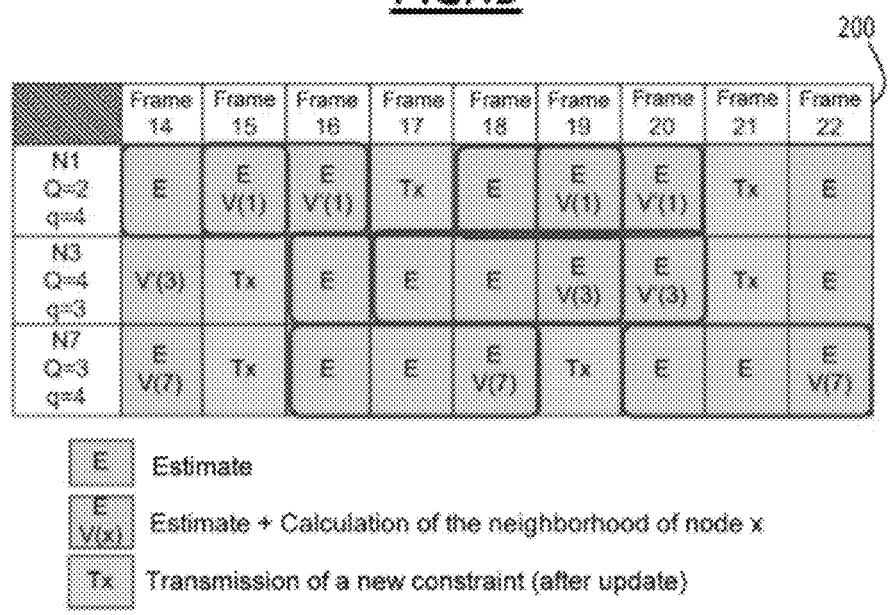

In FIG. 16, a table 200 shows a series of frames numbered from 14 to 22, and three nodes N1, N3 and N7. Node N1 imposes a constraint Q=2 on its neighbors and is itself subject to a constraint q=4. Node N3 imposes a constraint Q=4 on its neighbors and itself is subject to a constraint q=3. Node N7 imposes a constraint Q=3 on its neighbors and itself is subject to a constraint q=4. This example illustrates how the algorithm of the method takes advantage of the transmission delay slots to estimate its neighborhood and calculate the constraint. Following a transmission delay, the constraint Q calculated by a node called S is not sent to its neighbors. The neighbors of S therefore continue to use the same constraint as before. The nodes transmitting a message during a transmission delay frame T are, except in case of error due for example to a collision, the same as those transmitting to frame T-Q. The algorithm of the method uses the estimation of the number of neighboring and interfering nodes transmitting during frame T to recalculate the neighborhood of node S. The different neighborhood calculations are weighted according to relationship (2). In the example of FIG. 16, node N1 calculates, at the end of frame 15, its total neighborhood V(1). Node N1 must wait for frame 17 to be able to transmit the new constraint. At the end of frame 16, called transmission delay frame, a second calculation of the neighborhood V'(1) takes place, based on estimations done in frame 15 and 16 and V(1), V'(1) is used to calculate the new constraint to be transmitted in frame 17.

Figure 17:
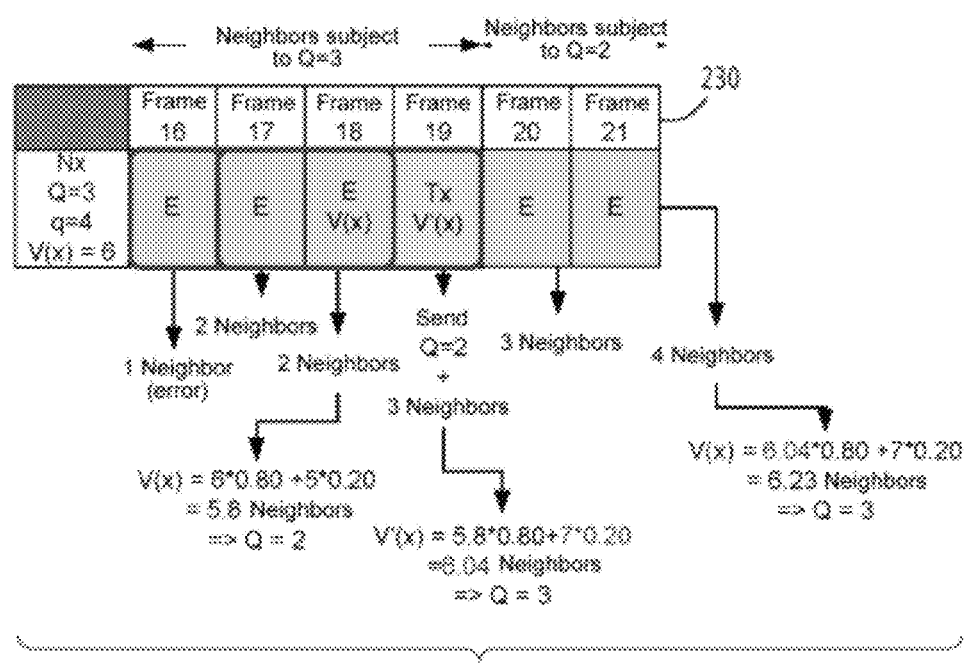

FIG. 17 illustrates one of the benefits of smoothing the estimation of the number of neighbors and interfering nodes during transmission slots. In that figure, table 230 shows a series of six frames numbered from 16 to 21, and a node Nx such as mod(x,4)=mod(15,4). Node Nx imposes a constraint Q=3 on its neighbors and is itself subject to a constraint q=4. One assumes that during frame 16, it commits an error by estimating having one neighbor instead of three, during frame 17 it estimates having two neighbors, and during frame 18 it estimates having two neighbors. One assumes that it does not commit any error in the estimations of the number of neighbors having transmitted in frames 17 and 18. At the end of frame 18, it estimates its total number of neighbors at five instead of seven, which leads it to impose a constraint Q=2 instead of Q=3 on its neighbors in frame 19, called transmission frame. In the example of FIG. 17, the smoothing of the estimation is implemented in the algorithm of the method according to the invention. The constraint calculated in frame 19 will not be taken into account because the constraint calculated in frame 18 has already been sent. On the other hand, the number of neighbors calculated in frame 19 is taken into account in the calculation of the neighborhood of the following frames owing to the smoothing of the estimate. Thus there is no loss of information related to the transmission of a constraint in a frame. In that example, smoothing of the estimate and use of the set of frames for the estimate are implemented by the algorithm, the estimate of the number of neighbors by a node is thus improved.

Because of the collisions, a node does not necessarily receive the maximum constraint to which it must submit, which can cause a strong variation in the estimated number of neighbors.

In a first solution, a node sends the constraint that it imposes on its neighbors as well as the constraint to which it subjects itself, no that its neighbors can know whether their constraint has been received.

Figure 18:
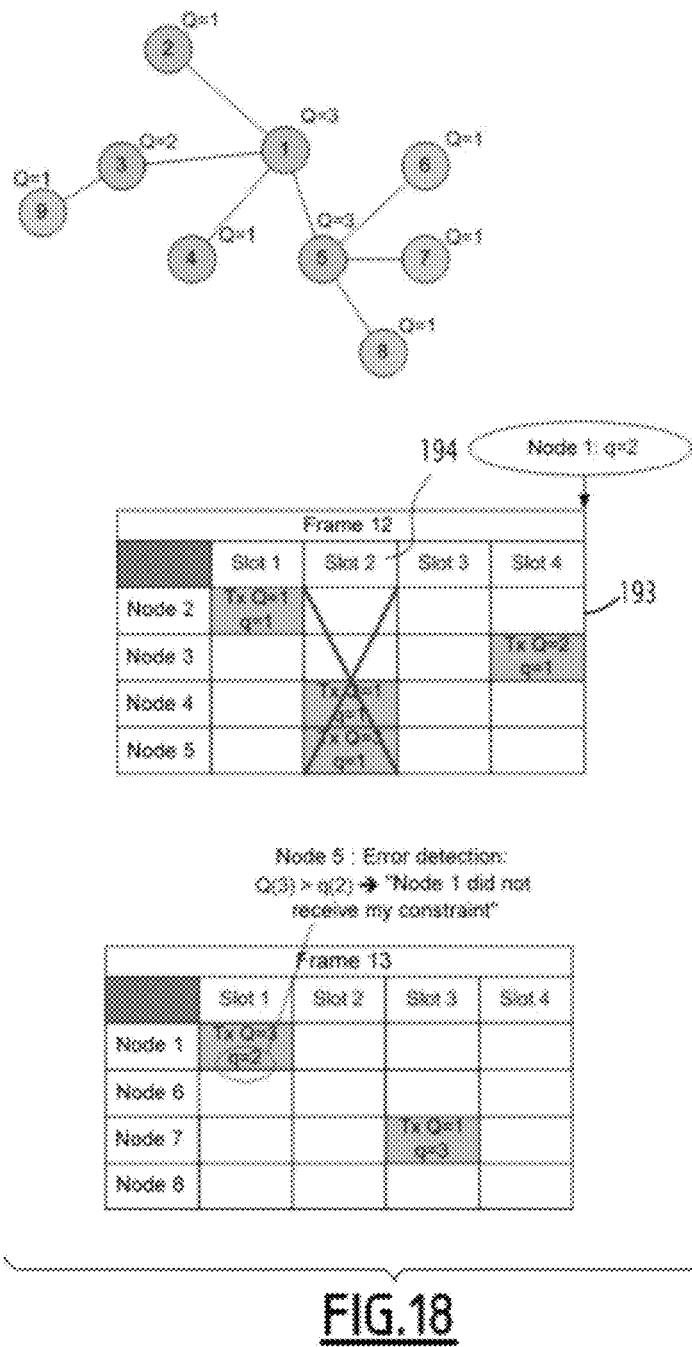

In FIG. 18, an ad hoc network is made up of nine nodes numbered from 1 to 9. One assumes that the nodes transmit messages in frames including four time slots indicated by "slot" in the figure. During a frame 11, one assumes that all of the nodes subject themselves to a constraint q=1. At the end of frame 11, each node of the network calculates the constraint Q, which it will impose on its neighbors. These constraints are transmitted in frame 12 and shown in FIG. 18. They will be used starting with frame 13. Table 193 shows the messages received by node 1 during frame 12. In the messages sent by a node, q designates the constraint to which it subjects itself and Q the constraint it imposes on its neighbors. During the time slot 194, there is a collision between the messages sent by nodes 4 and 5. Node 1 therefore subjects itself to the maximum constraint that it receives, i.e. Q=2, transmitted by node 3. During frame 13, one takes an interest in the messages received by the node 5, node having transmitted the strongest constraint during the preceding frame. Node 1 transmits both the constraint it imposes on its neighbors and the constraint to which is subjects itself. Thus, node 5 knows that node 1 is submitting to a lower constraint than that which it imposed. Node 5 is therefore capable of detecting the error. This solution has the advantage that a node can know in certain cases whether its estimate of neighbors will be poor and therefore will not update that estimate.

In a second solution a node knows the identity of the transmitter of the message it receives.

In FIG. 19, the same ad hoc network as that of FIG. 18 is considered. The same collision during frame 12 takes place. The node 1 therefore subjects itself to a constraint q=2. Node 5, having sent the constraint Q=3 in frame 12, estimates its neighborhood on frames 13 to 15. Table 195 shows the messages received by node 5 during these three frames 13, 14 and 15. In frame 15, node 1 transmits a second message in the period for estimating the neighborhood of the node 5. By comparing the identifiers of the transmitting nodes, node 5 detects this double transmission and does not take it into account.

This solution has the advantage that a node is capable in certain cases of detecting whether a neighboring node is transmitting more than one message during an estimating period, and then only counting that neighboring node once. Unlike the first solution, which only makes it possible to detect one error, this solution makes it possible, if the error is detected, to correct it. On the other hand, the first solution has the advantage of detecting the error from the moment where one of the messages from the node having made a mistake is correctly received, while the second solution can only detect the error if both messages from the node having made mistakes are correctly received. It is possible to implement, in the algorithm of the inventive method, either of these solutions or to combine them so as to benefit both from maximum detected errors and the possibility of correcting some of them.

The method according to the invention thus makes it possible to reduce the number of collisions without adjusting the size of the frames, and can in fact be used with a frame having a fixed size. The method also does not require the sending of additional signaling methods, for example beacon messages. Only two additional fields are added to the messages sent by the nodes.

The invention claimed is:

1. A method for transmitting information in an ad hoc network comprising at least two transceiver nodes able to receive and transmit information and communicating with each other by sending information in random access time slots organized in frames, wherein the nodes of the network are broken down into groups according to a distribution rule, the nodes of each group only having the right to transmit information in a predefined subset of frames specific to the group, comprising the steps of:
    defining, at each node (phase 24), a constraint (neighborConstraint) for the neighboring nodes, and transmitting, at each node (phase 24), the defined constraint (neighborConstraint) to the neighboring nodes, and
    defining, at each node (phase 26), the group to which it belongs according to the distribution rule as a function of the constraints (neighborConstraint) received from the neighboring nodes;
    wherein defining a constraint (neighborConstraint) by a node for the neighboring node includes estimating (56) the total number of neighboring or interfering transmitting nodes, and establishing (58) the constraint (neighorConstraint) as function of the smoothed total number of neighboring or interfering nodes and a target minimum probability ($P_{Seuil}$) that the neighbors of the node can transmit information without collisions.

2. The method according to claim 1, wherein the distribution rule of a node in a group takes into account the number of neighbor or interfering transmitting nodes that the neighboring nodes of the considered node have.

3. The method according to claim 1, wherein the node defines (phase 26) the group to which it belongs according to the distribution rule as a function of the constraint (neighborConstraint) received from the neighboring nodes leading to the lowest transmission frequency.

4. The method according to claim 3, wherein the step for defining a constraint (neighborConstraint) by a node for the neighboring nodes further comprises a step of: estimating the number of neighboring and interfering nodes that transmit for a given frame, and
    smoothing the total number of neighboring or interfering transmitting nodes.

5. The method according to claim 4, wherein the step of estimating the number of neighboring or interfering nodes that transmit for a given frame is based on measuring the number of time slots on which: no transmission has been detected, a single transmission has been received, and more than two transmissions generating a collision have been detected.

6. The method according to claim 1, wherein the step of estimating the total number of neighboring or interfering transmitting nodes includes a summation (56) of the number of neighboring or interfering nodes having transmitted messages in each of the frames corresponding to the set of distribution groups of the nodes according to the constraint (neighborConstraint) defined by the node and transmitted to its neighboring nodes.

7. The method according to claim 6, wherein the step of calculating the total number of neighboring or interfering transmitting nodes by a node includes a weighting of the calculated total number of current transmitting or interfering nodes, by the total number of neighboring or interfering transmitting nodes previously calculated for that node.

8. The method according to claim 1, wherein each node defines the group to which the each node belongs according to the distribution rule by subjecting the each node to a constraint (ownConstraint) among the constraints of the neighboring nodes (neighborConstraint) and in which the calculation of a constraint (ownConstraint) specific to a node is only done if at least one of the following three conditions is met:
    there are no higher constraints (neighborConstraint) received from a neighboring node (69),
    the neighboring node having defined the constraint (ownConstraint) to which the considered node subjects itself has transmitted a lower constraint (72),
    the expiration of a predetermined period of time (TimeToLive, 74).

9. The method according to claim 1, wherein each node defines the group to which the each node belongs according to the distribution rule by subjecting the each node to a constraint (ownConstraint) among the constraints of the neighboring nodes (neighborConstraint) and in which each node transmits (step 24) the constraint (ownConstraint) to which it subjects itself (msgConstraint).

10. The method according to claim 9, wherein a node having transmitted a constraint (neighborConstraint) to a preceding frame determines whether the constraint to which a neighboring node subjects itself (ownConstraint), and that it has received from that neighboring node, is below the constraint (neighborConstraint) that it transmitted and whether the constraint (ownConstraint) to which the neighboring node subjects itself is below the constraint (neighborConstraint) that it has transmitted, then the node does not take into account the estimating elements of its neighborhood calculated during the current frame.

11. The method according to claim 9, wherein a node imposing a constraint (neighborConstraint) on its neighbors determines whether a same neighboring node transmits at least twice during n consecutive frames, n being the constraint (neighborConstraint) imposed on the node, and if the neighboring node transmits at least twice during n consecutive frames, the node only takes the neighboring node into account a single time to define its number of neighboring or interfering transmitting nodes.

12. The method according to claim 1, characterized in that the transmissions between the nodes lack messages dedicated to the signaling to reduce the number of collisions in the network.

13. An ad hoc network including a set of transceiver nodes able to receive and transmit information and communicating with each other by sending information in frames wherein the nodes of the network are broken down into groups according to a distribution rule, and each node of the network only has the right to transmit information in a predefined subset of frames specific to the group, comprising the steps of:
    defining, at each node (phase 24), a constraint (neighborConstraint) for the neighboring nodes;
    transmitting, at each node (phase 24), the defined constraint (neighborConstraint) to the neighboring nodes;

defining, at each node (phase 26), the group to which it belongs according to the distribution rule as a function of the constraints (neighborConstraint) received from the neighboring nodes;

wherein defining a constraint (neighborConstraint) by a node for the neighboring node includes estimating (56) the total number of neighboring or interfering transmitting nodes, and establishing (58) the constraint (neighorConstraint) as function of the smoothed total number of neighboring or interfering nodes and a target minimum probability ($p_{Seuil}$) that the neighbors of the node can transmit information without collisions.

\* \* \* \* \*